Aug. 5, 1969    E. R. DUNN ET AL    3,458,957
DISC GRINDER

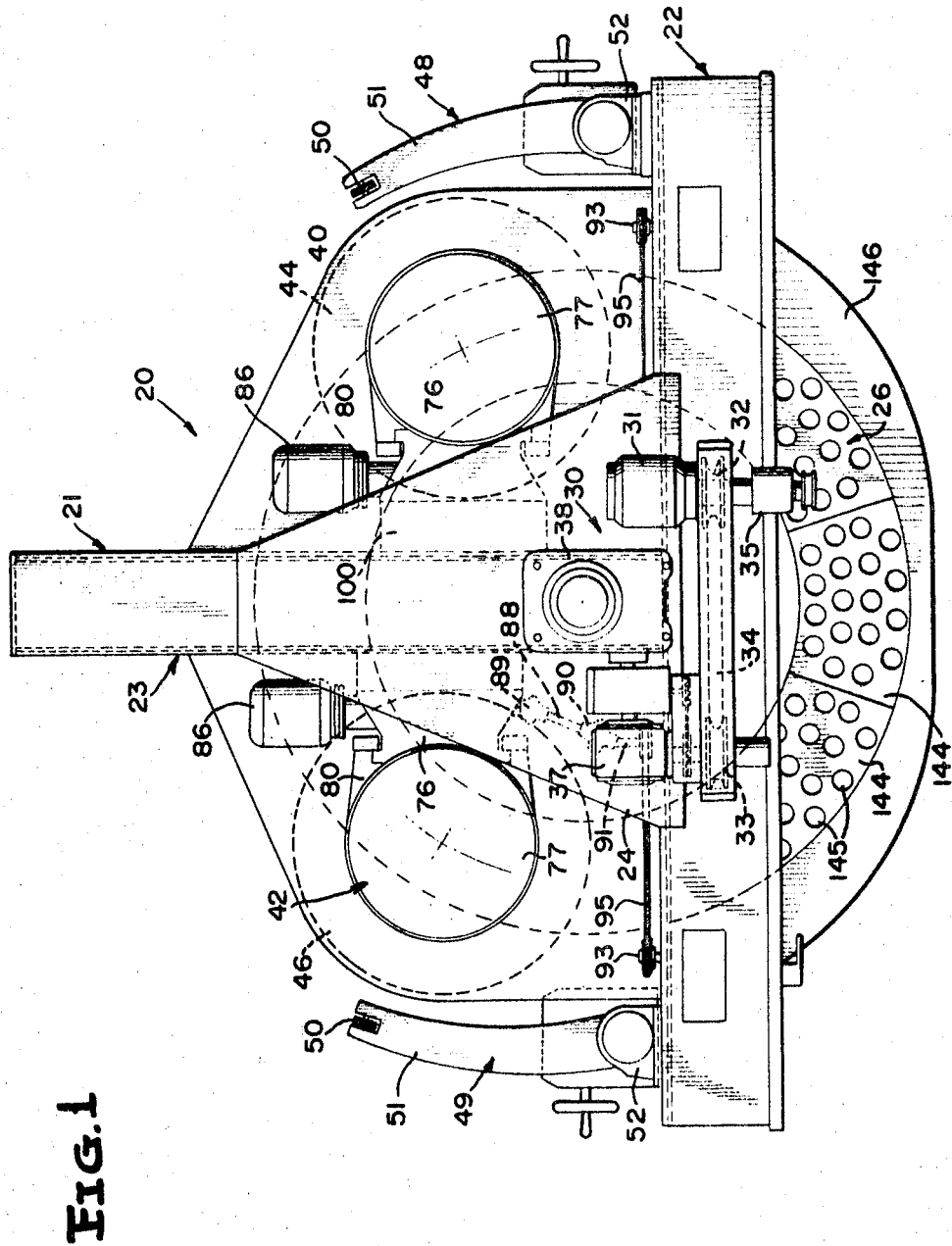

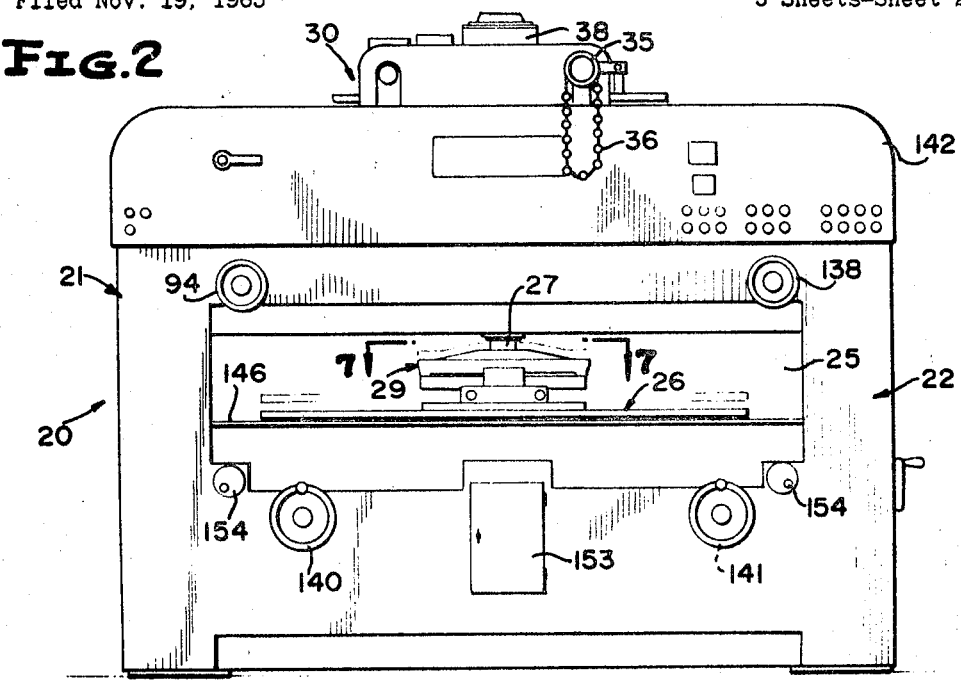
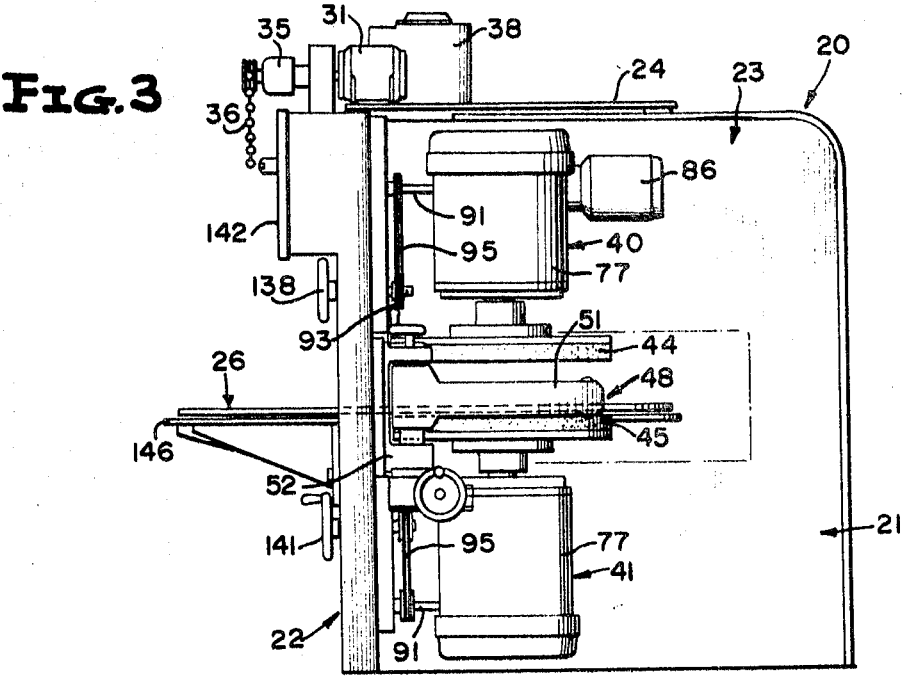

Filed Nov. 19, 1965    5 Sheets-Sheet 3

INVENTORS
ELMAN R. DUNN &
VERNE L. LOOFBORO

BY Mason, Porter, Diller & Brown
ATTORNEYS

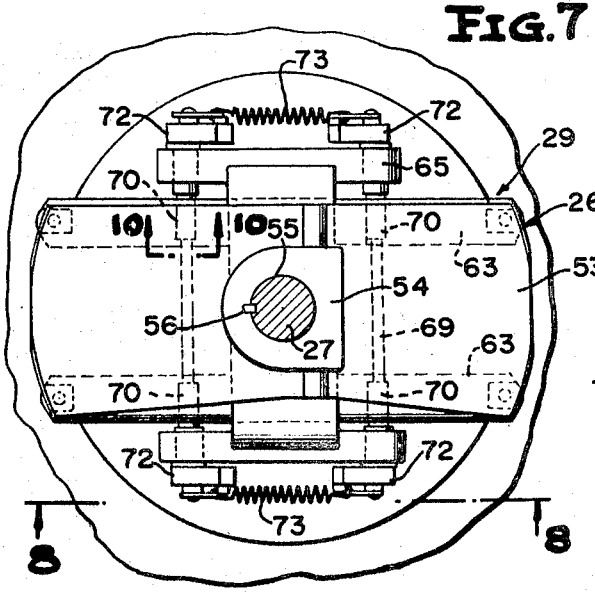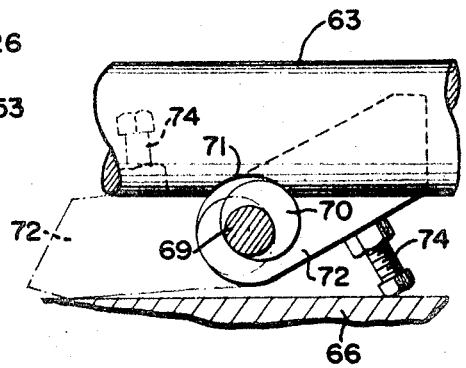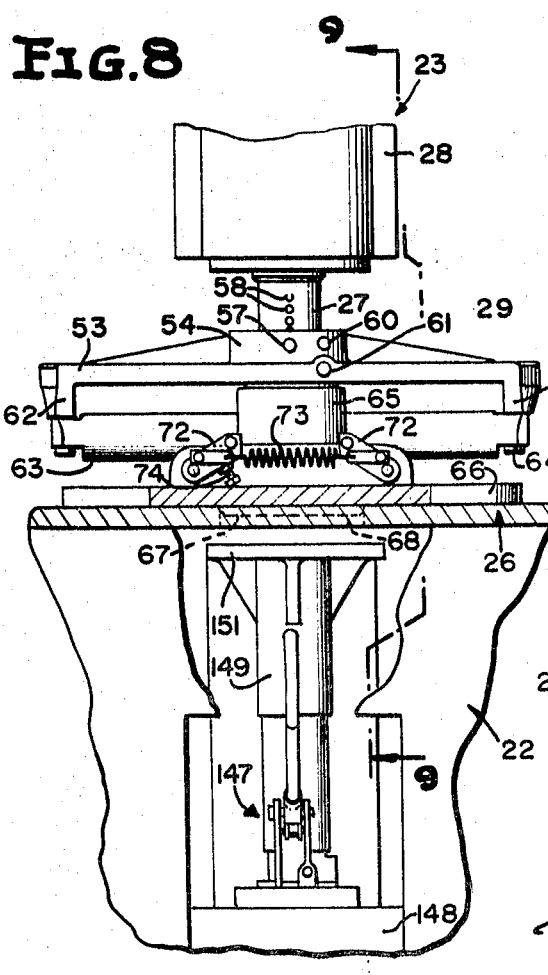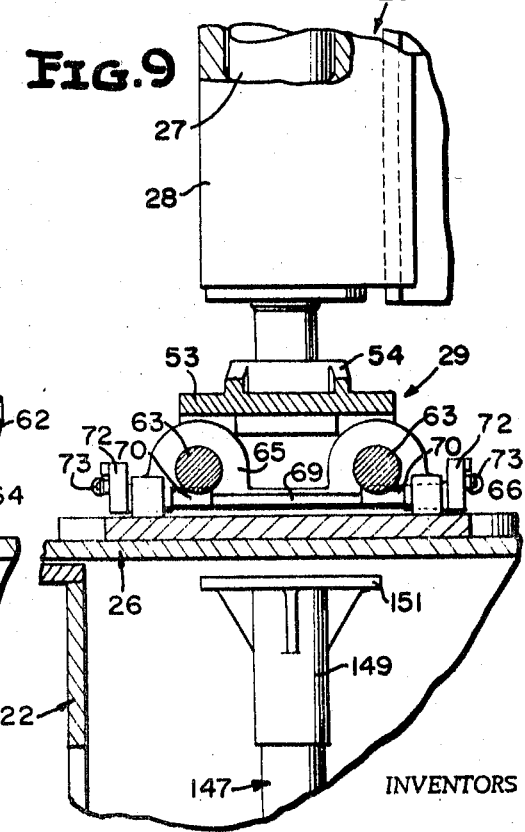

Aug. 5, 1969 E. R. DUNN ET AL 3,458,957
DISC GRINDER
Filed Nov. 19, 1965 5 Sheets-Sheet 5

INVENTORS
ELMAN R. DUNN &
VERNE L. LOOFBORO

BY Mason, Porter, Diller & Brown
ATTORNEYS

United States Patent Office 3,458,957
Patented Aug. 5, 1969

3,458,957
DISC GRINDER
Elman R. Dunn, Roscoe, and Verne L. Loofboro, Rockton, Ill., assignors, by mesne assignments, to Landis Tool Company, Waynesboro, Pa., a corporation of Delaware
Filed Nov. 19, 1965, Ser. No. 508,678
Int. Cl. B24b 5/00
U.S. Cl. 51—118    22 Claims

ABSTRACT OF THE DISCLOSURE

This disclosure has to do with a disc grinder of the type which includes two sets of grinding discs arranged on opposite sides of a path of movement of a work carrier for simultaneously grinding opposite ends or surfaces of workpieces carried by the work carrier. In order to facilitate the mounting of the work carrier and the grinding discs in a balanced condition, the grinder has a T-shaped frame including a front section and a transverse section with the sets of grinding discs being mounted on the transverse section on opposite sides thereof. Each grinding disc is mounted on the transverse section in a manner wherein the tilting and swiveling movement thereof are correlated and accomplished by means of a single setting operation. The carrier is suspended by means of an overhead mount carried by the transverse frame section and said mount is vertically adjustable. In addition, the work carrier is mounted on the spindle for radial movement relative to the spindle to provide clearance for the performing of operations on the abrasive disc units, such as dressing operations.

---

This invention relates in general to new and useful improvements in disc grinders, and more particularly to a novel grinder of the type wherein articles to be ground are mounted within a work carrier and moved between a pair of opposed abrasive discs for the purpose of finishing the opposed faces of the workpieces.

A primary object of this invention is to provide a novel disc grinder wherein the frame is of a T-shaped configuration in plan and all of the components of the machine are directly suspended from the frame whereby not only is a greater stability of the machine possible due to the T-shaped configuration and therefore three point mounting of the frame, but also because the usual cantilever mounting of components is eliminated.

Another object of this invention is to provide a novel disc grinder which is of a fully balanced construction, the disc grinder including a T-shaped frame formed of an upright front section and a transverse section, and there being suspended from the transverse section a work carrier for rotation, and on opposite sides of the transverse section there are mounted pairs of disc grinder units for grinding workpieces moved therebetween by the work carrier.

Another object of this invention is to provide a novel disc grinder of the foregoing type wherein dressers for the abrasive discs of the disc grinders are mounted on the rear face of the upright section for movement in between pairs of abrasive discs to effect a face truing operation thereon.

Another object of this invention is to provide a novel disc grinder which includes a T-shaped frame having mounted therein a horizontally disposed work carrier, the frame supporting pairs of disc grinder units for performing grinding operations on workpieces carried by the work carrier, the frame being notched for receiving the work carrier and the work carrier projecting forwardly of the frame whereby a portion of the work carrier is readily accessible to facilitate the loading and unloading thereof.

Still another object of this invention is to provide a novel disc grinder which includes a T-shaped frame formed of a front section and a transverse section, the transverse section having mounted therein a spindle from which a work carrier is suspended, and there being mounted on the upper forward part of the frame in a readily accessible position drive mechanism for effecting the driving of the work carrier.

Another object of this invention is to provide a disc grinder which includes a horizontally mounted work carrier movable between two pairs of disc grinder units, the work carrier being suspended from a vertical spindle and there being a mounting unit mounting the work carrier on the spindle, the mounting unit includes a horizontally shiftable connection whereby the work carriage may be shifted to out of the way positions relative to the disc grinder units so as to permit the dressing of abrasive discs.

A further object of this invention is to provide a novel mounting for a disc grinder unit of the type wherein the face of an abrasive disc carried thereby is tilted with respect to the path of movement of a workpiece, and the movement of the workpiece past the abrasive disc is in angular relation to the support on which the disc grinder unit is mounted, the disc grinder unit being mounted relative to the support for both adjustable tilting and adjustable swiveling movement to assure the proper angular relationship of the face of the abrasive disc relative to a moving workpiece, and there being a single operable control for simultaneously adjusting both the tilt and swivel.

A still further object of this invention is to provide a novel mounting of a disc grinder unit of the foregoing type wherein the disc grinder unit is vertically adjustable and is mounted on a slide, which, in turn, is carried by a guide, the guide being the component which is tilted and swiveled relative to the support.

Still another object of this invention is to provide a novel disc grinder wherein the center of the work carrier is offset from a line joining the disc grinder units whereby a triangular relationship results between the center of the work carrier and the centers of the disc grinder unit to provide a more stable frame construction and a more accessible arrangement of the discs.

With the above and other objects in view that will hereinafter appear, the nature of the invention will be more clearly understood by reference to the following detailed description, the appended claims and the several views illustrated in the accompanying drawings.

In the drawings:
FIGURE 1 is a plan view of the disc grinder.
FIGURE 2 is a front elevational view of the disc grinder.
FIGURE 3 is a side elevational view of the disc grinder as viewed from the right in FIGURE 2.
FIGURE 4 is a rear elevational view of the disc grinder.
FIGURE 5 is a schematic plan view showing the manner in which the work carrier may be shifted relative to the abrasive discs to permit operations to be performed on the abrasive discs.
FIGURE 6 is a fragmentary vertical sectional view taken through a central portion of the disc grinder and shows the manner in which a jack may be utilized for vertically positioning the work carrier.
FIGURE 7 is an enlarged fragmentary horizontal sectional view taken along the line 7—7 of FIGURE 2 and shows the details of a support suspending the work carrier from a spindle for horizontal shifting movement transversely of the axis of the spindle.

FIGURE 8 is a fragmentary vertical sectional view taken along the line 8—8 of FIGURE 7 and shows further the details of the work carrier support.

FIGURE 9 is a fragmentary vertical sectional view taken along the line 9—9 of FIGURE 8 and shows further the details of the work carrier support.

FIGURE 10 is an enlarged fragmentary vertical sectional view taken generally along the line 10—10 of FIGURE 7 and shows the specific details of the means for locking the work carrier in a centered position with respect to the spindle.

Figure 4:
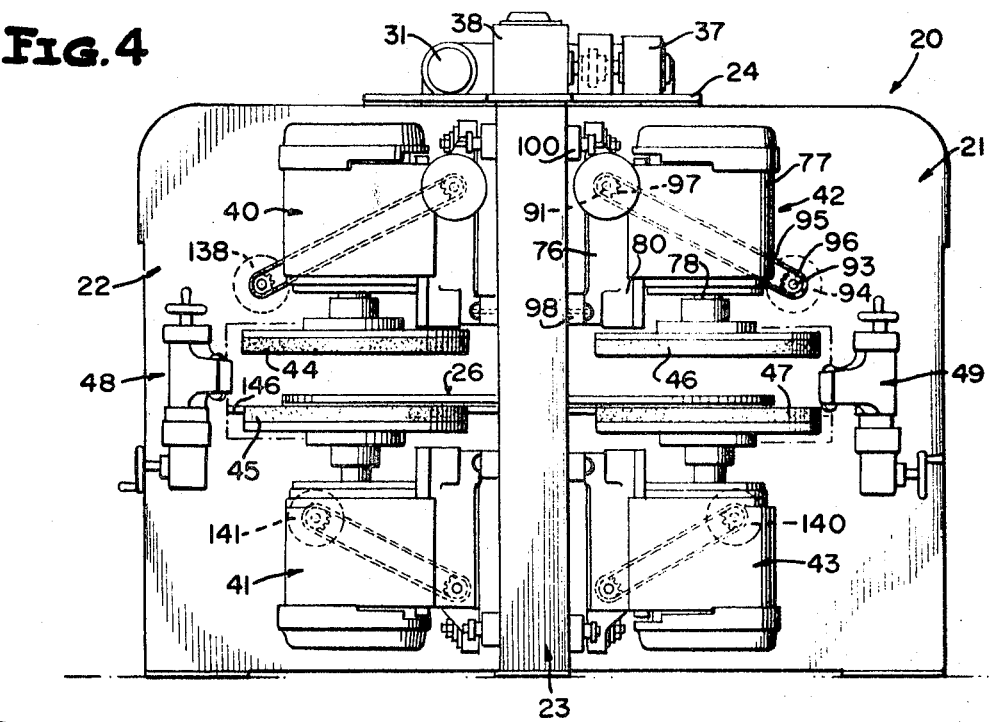

Referring to the drawings in detail, it will be seen that the disc grinder, which is generally referred to by the numeral 20, includes a rigid frame of a T outline in plan. The rigid frame is generally referred to by the numeral 21 and includes a front section 22 and a transverse section 23. At least the upper edges of the upright section 22 and the transverse section 23 are joined together by a gusset plate 24.

The advantages of the T shaped configuration of the frame 21 are numerous as will become apparent hereinafter. However, a basic advantage of the T shaped configuration is immediately apparent. The T staped configuration provides for three points of support for the frame 21. Inasmuch as any three points must lie in a plane, the frame mounting will be more stable than any other configuration.

The frame 21 is horizontally notched to provide a horizontal opening 25 (FIGURE 2) in which there is positioned a work carrier, which is generally referred to by the numeral 26. The work carrier 26 is carried by a vertical spindle 27 (FIGURE 9) which is mounted in suitable bearings in a vertical frame member 28 formed in the upper part of the transverse section 23 adjacent its connection with the upright section 22. The work carrier 26 is supported from the spindle 27 by means of a support which is generally referred to by the numeral 29 and which will be described in more detail hereinafter.

The work carrier 26 is driven through the spindle 27 by means of a drive unit, which is generally referred to by the numeral 30. The drive unit 30 is mounted in a readily accessible position behind the top front portion of the frame 21 as is clearly shown in FIGURE 1. The drive unit 30 includes an electric motor 31 which carries a drive pulley 32. The drive pulley 32 is aligned with a driven pulley 33 and is connected thereto by means of a drive belt 34. The drive pulley 32 is of the adjustable type so as to vary the drive ratio between the pulleys 32 and 33. The drive pulley 32 is of a conventional construction and has a conventional adjusting mechanism 35 which includes a readily accessible operating chain 36 (FIGURE 2).

The driven pulley 33 is mounted on an input shaft of a reduction gear box 37 which, in turn, is coupled to a right angle drive box 38. The right angle drive box 38 is suitably connected to the upper end of the spindle 27.

At this time it is pointed out that the work carrier 26 projects forwardly beyond the upright section 22 and has a large portion thereof constantly exposed. Thus, the loading station of the disc grinder 20 is at the front thereof and from this same general station, the operation of the disc grinder can be effectively carried out inasmuch as the front section 22 also serves as a control panel, as will be described in more detail hereinafter.

The transverse section 23 carries four disc grinder units, there being two units on each side of the transverse section 23 and one unit of each pair of units being disposed above the work carrier 26 and the other unit being disposed below the work carrier 26. The relationship of the disc grinder units is best shown in FIGURE 4 where it will be seen that the various disc grinder units are referred to by the numerals 40, 41, 42 and 43. The disc grinder unit 40 is considered the upper right hand unit while the disc grinder unit 41 is considered the lower right hand unit. In a like manner, the disc grinder unit 42 is considered the upper left hand unit while the disc grinder unit 43 is considered to be the lower left hand unit. Each of the four disc grinder units is mounted for individual adjustment in a vertical direction, tilting and swivelling.

Referring once again to FIGURE 4 in particular, it will be seen that the disc grinder units 40 and 41 cooperate with the disc grinder unit 40 having an abrasive disc 44 which faces downwardly in opposition to an upwardly facing abrasive disc 45 carried by the disc grinder unit 41. In a like manner, the disc grinder unit 42 has a downwardly facing abrasive disc 46 which opposes an upwardly facing abrasive disc 47 carried by the disc grinder unit 43. Both the abrasive discs 44 and 45, acting as a pair, and the abrasive discs 46 and 47, acting as a pair, are disposed in converging relation in the direction of the travel of the work carrier 26 therebetween. By vertically adjusting the discs of each pair of abrasive discs, workpieces of different dimensions may be accommodated. By varying the angle of relative tilt of each pair of abrasive discs, the amount of grinding which takes place during a pass of a workpiece between a pair of abrasive discs may be controlled.

It will be readily apparent from FIGURES 1 and 4 that by directly mounting the four disc grinder units on opposite sides of the transverse section 23, both a firmer mounting of the disc grinder units may be accomplished and a more balanced condition may result. Furthermore, by positioning the center of rotation of the work carrier 26 between the front section 22 and a line extending between the centers of the disc grinder units 40 and 42, additional stability is obtained. It will be readily apparent that the T shaped plan configuration of the frame 21, together with the specific position of the work carrier 26 and the disc grinder units 40, 41, 42 and 43 provide for a very compact construction which provides for the accessible mounting of the abrasive discs, is highly stable, and has all of the advantages of past disc grinders of this type without embodying many of the undesired disadvantages thereof.

Another advantageous feature of the T shaped frame construction is that dressers, which are generally referred to by the numerals 48 and 49 may be readily mounted on the rear surface of the front section 22 in position for swinging in between the adjacent pairs of abrasive discs. Each dresser includes a pair of dresser wheels 50 whereby the faces of each pair of abrasive discs may be readily dressed. The dresser rolls 50 are carried by an elongated arm 51 which is mounted on a support 52 directly carried by the rear face of the front section 22 for pivoting generally about a vertical axis. It is to be understood that each of the dressers 48 and 49 will be provided with suitable adjustments to permit the movement of the dresser rollers 50 into the desired dressing engagement with the several abrasive discs.

The mounting of the dressers 48 and 49 directly on the frame 21 of the disc grinder 20 has the advantage in that there can be no relative movement between the dressers 48 and 49 and the abrasive discs of the several disc grinder units. Since there can be no relative motion between the components of the disc grinder, except that which is specifically provided for by adjustment, the several abrasive discs may be readily and accurately dressed.

Figure 5:
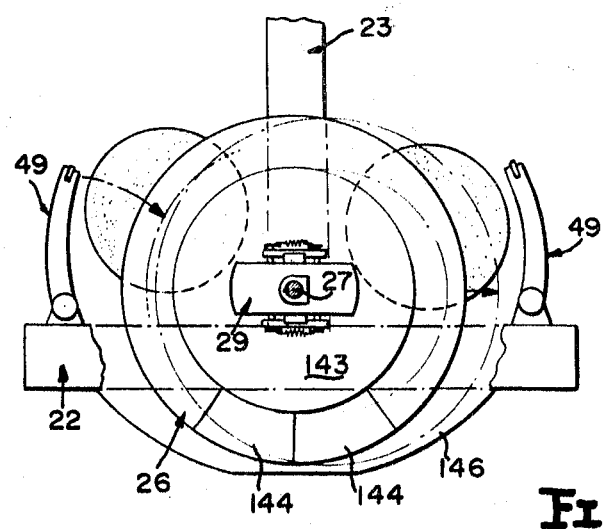

As will be apparent from FIGURES 1 and 5, the center of the path of movement of workpieces between the various abrasive discs coincide generally with the centers of the abrasive discs. Thus, it will be apparent that the work carrier 26 is normally in a position which interferes with the dressing of the faces of the abrasive discs or work on the disc grinder units, such as the replacement of abrasive discs. It is for this purpose that the special support 29 has been provided. The support 29 is constructed to permit the shifting of the work carrier 26 transversely so as to first generally clear one set of dressing tools 48 and then the other set of dressing tools 49, as is schematically shown in FIGURE 4.

Referring to FIGURES 7 (through 10, inclusive, it will be seen that the support 29 includes an upper reinforced plate member 53 which has a sleeve portion 54 extending therethrough and projecting both above and therebelow. The sleeve portion 54 has a centrally located bore 55 in which there is positioned the lower end of the spindle 27. The sleeve portion 54 is keyed relative to the spindle 27 by means of a key 56. The sleeve portion 54 is slidably mounted on the spindle 27 and is retained in a vertically adjusted position by means of a set screw 57. In order to lock the sleeve 54 in a predetermined vertically adjusted position, the lower part of the spindle 27 is provided with a plurality of small bores 58 for receiving the pointed end of the set screw 57. The sleeve portion 54 is also locked in a vertically adjusted position on the spindle 27 by means of a pair of clamp plugs 60 and 61.

The plate 53 is provided at the opposite ends thereof with depending legs 62 to which there are clamped the ends of a pair of parallel, horizontally extending guide bars 63. The guide bars 63 are secured to the legs 62 by means of fasteners 64.

The support 29 also includes a lower carrier portion 65. The carrier portion 65 is slidably mounted on the guide bars 63 in the manner best shown in FIGURE 9 for sliding movement therealong. The carrier portion 65 has projecting downwardly from the underside thereof a mounting plate 66 which has secured to the underside thereof the work carrier 26. The mounting plate 66 has a depending boss 67 which is centered in a circular opening 68 former in the center of the work carrier 26.

The carrier portion 65 has journalled in the lower portion thereof above the mounting plate 66 a pair of shafts 69 which are disposed at right angles to the guide bars 63. Each shaft 69 has a pair of cam portions 70 with each cam portion 70 underlying and being aligned with an associated one of the guide bars 63. Referring to FIGURE 10, it will be seen that each guide bar 63, at its intersection with each shaft 69, has a notch 71 formed in the underside thereof. The cam surface 70 associated with the particular guide bar 63 is seatable against the surface of the notch 71 to lock the carrier portion 65 in a centered position with respect to the sleeve portion 54.

In order to assure the automatic centering of the carrier portion 65 with respect to the sleeve portion 54 after each shifting of the work carrier 26, the opposite ends of each shaft 69 are provided with a lever 72. The levers 72 at adjacent ends of the shafts 69 are interconnected by means of springs 73 in the manner best shown in FIGURES 7 and 8. One of the springs urges the lever 72 of FIGURE 10 in a clockwise direction urging the cam portion 70 thereof into tight engagement with the wall of the associated notch 71. It will be noted that the cam surface 70 in FIGURE 10 urges the carrier portion 65 to the left. The parallel adjacent one of the cam surfaces 70 will urge the carrier portion 65 to the right, thereby serving to center the carrier portion 65 relative to the sleeve portion 54.

In order to limit the pivoting of the lever 72 under the influence of the springs 73 to clamp the guide bars 63, one lever of each pair of levers carried by each shaft 69 is provided with an adjustable stop 74. The adjustable stops 74 engage the mounting plate 66 of the carrier portion 65 to limit the pivoting of the shaft 69, as is shown in FIGURE 10. It is also pointed out here that when the levers 72 are rotated apart to release the carrier portion 65 from the guide bars 63, the connections between the springs 73 and the levers 72 will move to overcenter positions and the springs 73 will serve to hold the levers 72 in the released positions of the shafts 69, as is shown in phantom lines in FIGURE 10.

From the foregoing, it will be apparent that when it is desired to perform work which requires clearance between the abrasive discs, the work carrier 26 is stopped in a position with the guide bars 63 extending transversely of the frame 21, as is shown in FIGURE 2. The levers 72 which are exposed, are then swung apart so as to unclamp the carrier portion 65 from the guide bars 63. The work carrier 26 is then shifted in the desired direction to obtain the required access. After a dressing operation or other work has been performed, the work carrier 26 is again returned to a substantially centered position, after which the levers 72 are swung back to their normal positions and the work carrier is locked in its centered position with respect to the spindle 27 by the coaction of the cam surfaces 70 with the surfaces of the notches 71. At this time it is pointed out that when the work carrier 26 is initially adjusted to a centered position relative to the spindle 27, aligned marks may be made on the plate 53 and the carrier portion 65 and these marks may be periodically checked after the return of the work carrier 26 to a centered position to make certain that the cams 70 are properly functioning to center the work carrier.

Referring now to FIGURES 11 through 14, it will be seen that there is illustrated the details of the mounting of the disc grinder unit 42 which is typical of the mounting of the other disc grinder units. The mounting for the disc grinder unit 42 includes a guide 76 which is mounted on a vertical wall of the transverse section 23 in a vertically fixed position but for controlled tilting and swivelling. There is mounted on the guide 76 for vertical movement relative thereto the grinding head of the disc grinder unit 42, which grinding head, as is best shown in FIGURE 4, consists of an electric motor 77 having a shaft 78 on which the abrasive disc 46 of the disc grinder unit 42 is fixedly mounted for rotation therewith. The electric motor 77 is carried by a slide 80 which is slidably mounted on the guide 76 for guided movement relative to the guide 76 in a vertical direction only.

There is mounted in the guide 76 a lead screw 81 which is vertically disposed. The lead screw 81 has mounted thereon a screw threaded follower 82 which is releasably secured to the slide 80. It will be apparent that when the lead screw 81 is rotated and the follower 82 is moved vertically, the grinding head will likewise move vertically.

In order to effect the vertical adjustment of the abrasive disc 46 of the disc grinder unit 42, the upper end of the lead screw 81 is provided with a worm wheel 83 with which there is meshed a worm gear 84 formed on a control shaft 85. The control shaft may be driven in any manner. However, in the preferred embodiment of this invention, two separate drives are provided for the control shaft 85. The first of these drives is by means of an electric motor 86 which is connected to the control shaft 85 by means of a suitable coupling 87. The other of the drives is a manual drive and includes a shaft 88 which is connected to the control shaft 85 by means of a universal coupling 89. The forward end of the shaft 88 is connected by means of a universal coupling 90 (FIGURE 1) to a shaft 91 which is supported by the front section 22 and which projects from the rear wall thereof. There is carried by the front section 22 another shaft 93 which is suitably journalled in the front section 22 and projects rearwardly from the rear wall thereof. To the forward end of the shaft 93 there is connected a hand wheel 94 which is best shown in FIGURE 2. The shaft 93 is drivingly connected to the shaft 91 by means of a drive chain 95 which is entrained over a drive sprocket 96 carried by the shaft 93 and a drive sprocket 97 carried by the shaft 91.

In order that the guide 76 may be tilted and swiveled with respect to the transverse section 23, it is spaced outwardly away from the face of the transverse section 23 by means of a pair of mounting blocks 98 and 100 which are rigidly secured in place on the transverse section 23. The mounting block 98 is provided with a centrally located pivot pin 101 which projects outwardly therefrom and which functions as a pivot about which the guide 76 swivels. The pivot pin 101 has mounted thereon for pivoting about the axis of the pivot pin 101 a bar 102. The bar 102 has two shaft portions 103 which are generally semicircular in section with the flat sides thereof generally opposing the mounting block 98. The guide 76, in turn, has two seat portions which are rockably seated on the shaft portions 103 for tilting movement above the axis of the portions 103. In this manner the guide 76 may be both tilted about the horizontal axis of the shaft portions 103 and swiveled about the also horizontal axis of the pivot pin 101.

The upper part of the guide 76 is in the form of a portion of reduced width, which portion is referred to by the numeral 104. The guide portion 104 has a large central opening 105 therein. The opening 105 of the guide portion 104 has seated therein a first wedge member 106 which is in the form of a sleeve having a forwardly projecting mounting flange 107 which is seated in a slight recess in the front face of the guide portion 104. The rear surface of the wedge member 106 is cut at an angle to define a wedge surface 109.

The upper mounting bar 100 carries a centrally located clamping stud 110 which loosely passes through the bore 111 of the wedge member 106. A second wedge member 112 is centered over the clamping stud 110 and has the rear end thereof seated in a recess 113 formed in the mounting bar 100. The wedge member 112 has a bore 114 therethrough of a size slightly larger than the diameter of the clamping stud 110 to permit a slight rocking of the wedge member 112. The rear end of the wedge member 112 is rounded as at 115 in FIGURE 13 and rockably engages a seat defined by a washer 116 carried by the clamping stud 110 and seated in the recess 113. The second wedge member 112 has an outwardly facing sloping wedge surface 117 which is complementary to the wedge surface 109 and is normally in abutting engagement therewith.

It will be noted that the wedge surfaces 109 and 117 are disposed along a vertical plane. Inasmuch as the wedge member 106 carried by the portion 104 of the guide 76 and the wedge member 112 is fixedly carried by the mounting bar 100, when the guide 76 is pivoted about the pivot pin 101 in a swivelling movement, the wedge member 106 will be moved generally horizontally relative to the wedge member 112 with the result that the upper guide portion 104 will be displaced outwardly from the mounting bar 100 when the guide portion 104 is moved to the right in FIGURE 14, and may be moved inwardly towards the mounting bar 100 when the guide portion 104 is moved to the left in FIGURE 14.

Figures 11, 12:
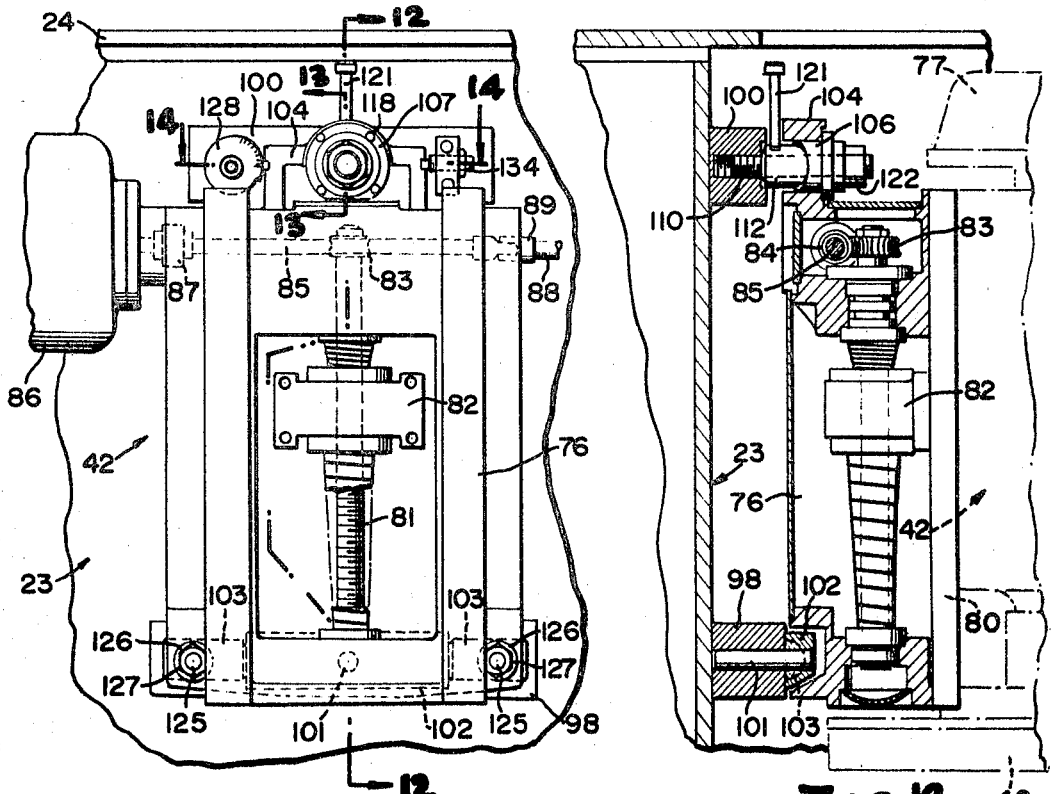
FIGURE 11 is an enlarged fragmentary elevation view showing the details of the support for mounting one disc grinder unit for vertical, tilting and swivelling adjustment.
FIGURE 12 is a fragmentary vertical sectional view taken along the line 12—12 of FIGURE 11 and shows the specific details of the three adjustments.
Figures 13, 14:
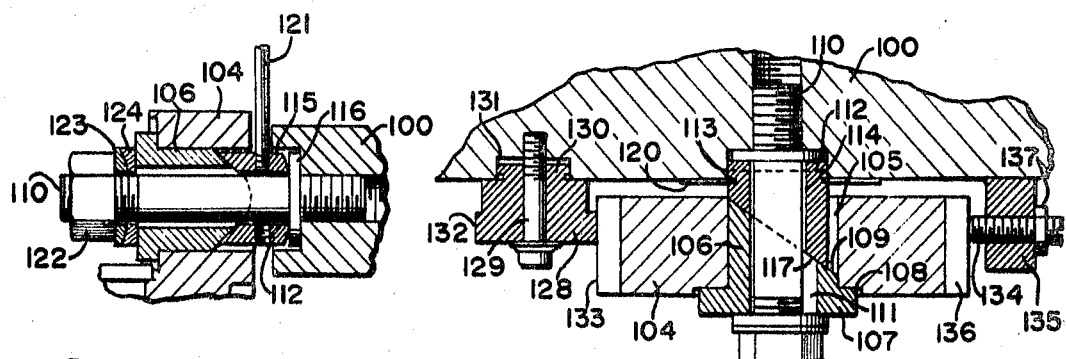
FIGURE 13 is an enlarged fragmentary vertical sectional view taken along the line 13—13 of FIGURE 11 and shows the specific details of the tilting adjustment.
FIGURE 14 is an enlarged fragmentary horizontal sectional view taken along the line 14—14 of FIGURE 11 and shows further the details of the tilting adjustment.

It is pointed out at this time that the wedge member 106 is fixed against rotation within the guide 76 by means of suitable fasteners 118 which pass through the flange 107. These fasteners are best shown in FIGURE 11. The wedge member 112 is normally tightly held against the wedge member 106 by means of a leaf spring 120 which bears against the exposed face of the mounting bar 100. In addition, the wedge member 112 may be held against rotation by means of a projecting rod 121 which is clearly shown in FIGURE 11.

The exposed end of the clamping stud 110 is provided with a nut 122 which is tightened down after the desired adjustment of the position of the guide 76 has been accomplished. It is to be noted that the nut 122 bears against a washer set which includes a convex washer 123 and a concave washer 124. The purpose of the washer set is to compensate for the tilting of the wedge member 106 with the guide 76 relative to the clamping stud 110 about the axis of the portions 103.

At this time it is pointed out that the guide 76 is also clamped in an adjusted position by means of two clamp studs 125 which pass through the lower portion of the guide 76 and through the bar 102. It is to be understood that the fit of the clamp studs 125 within the bar 102 and the guide 76 is a slightly loose one to permit the desired swivelling and tilting. Each of the clamp studs 125 is provided with a washer assembly 126 and a nut 127.

The guide 76 is swivelled about the pivot pin 101 by means of a cam 128 that is mounted on a shaft portion of a bolt 129 projecting from the mounting block 100. The cam 128 has a reduced end portion 130 which is seated within a recess 131 formed in the mounting block 100 so as to fixedly position the cam 128 except for rotary movement. The cam 128 has a cam surface 132 which engages a suitable cam follower 133 carried by the guide portion 104.

It will be readily apparent that movement of the guide portion 104 and the entire disc mounting to the left is controlled by engagement of the cam follower 133 with the cam surface 132 of the cam 128. After the cam 128 has been adjusted to the desired position, the movement of the guide portion 104 to the right is prevented by means of an adjustable stop screw 134 which is threadedly engaged in a bracket 135 projecting from the mounting block 100. The stop screw 134 engages a suitable follower like projection 136 on the guide portion 104. The stop screw 134 is retained in an adjusted position by means of a lock nut 137. It is to be understood that the stop screw 134 is utilized to clamp the guide portion 104 with the cam follower 133 tightly engaging the cam surface 132.

It is now pointed out that the angle of taper of the wedge surfaces 109 and 117 is a predetermined angle which will provide for the proper tilting of the associated abrasive disc in unison with the swivelling thereof whereby the abrasive disc will be tilted in alignment with the path of movement of workpieces therepast. When the angle of slope of the wedge surfaces 109 and 117 is the proper one, and the cam 128 is adjusted to the desired angle of swivel, the wedge members 106 and 112 will automatically provide the desired degree of tilt. Thus, a single adjustment automatically provides the desired degree of swivel and tilt.

Referring once again to FIGURE 2 in particular, it will be seen that the front section 22 has the forward portion thereof in the form of a control panel. In addition to the aforementioned control wheel 94 for vertically adjusting the disc grinder unit 42, the upright section 22 carries a control wheel 138 which corresponds to the control wheel 94 and controls the vertical position of the disc grinder unit 40. Lower control wheels 140 and 141 control the vertical positions of the disc grinder units 42 and 41, respectively. Other controls, such as motor controls, are carried by the upper part of the front section 22 to fully control the operation of the disc grinder 20. It is to be noted from FIGURE 3 that the upper portion of the front section 22 projects outwardly a greater extent as at 142 to facilitate the mounting of the necessary controls.

Reference is now made to FIGURES 1 and 5 in particular wherein it will be seen that the work carrier 26 includes an inner section 143 which is a permanent part thereof and replaceable outer sections 144. The replaceable sections 144 have work receiving openings 145 therein in accordance with the workpieces to be ground.

It has been previously pointed out that inasmuch as the work carrier 26 projects forwardly of the front section 22, a convenient front loading station is provided. In order that the workpieces, which freely pass through the openings 145, may be retained in the work carrier 26 as it rotates, a support plate 146 underlies the replaceable sections 144 of the work carrier 26 except where the replaceable sections 144 pass between the abrasive discs. In this manner, workpieces are continuously supported as they are carried by the work carrier 26.

Figure 6:
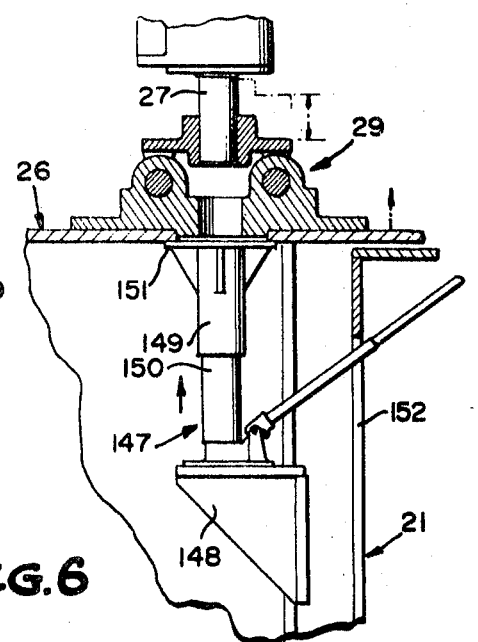

In the use of the disc grinder 20, normally the support plate 146 is vertically fixed and the disc grinder units 41 and 43 are not normally adjusted. Instead, when the heights of workpieces are varied, the disc grinder units 40 and 42 are vertically adjusted and the work carrier 26 is moved vertically to provide the necessary centered position thereof with respect to the workpieces. In order that the relatively heavy work carrier may be readily vertically adjusted, the frame 21 is provided with a jack as is best shown in FIGURE 6. The jack, which is generally referred to by the numeral 147, is mounted on a suitable bracket 148 within the frame 21. The jack 147, in addition to the usual jack structure, has an upper sleeve portion 149 which is guided on the barrel 150 of the jack 147. The sleeve portion 149 terminates at its upper end in a plate 151 which is engageable with the underside of the work carrier 26 in alignment with the spindle 27. The jack 147 is readily accessible through an opening 152 formed in the front panel of the front section 22, the opening 152 normally being closed by a small door 153, as is best shown in FIGURE 2.

When it is desired to vertically adjust the work carrier 26, either upwardly or downwardly, the jack 147 is moved to a position contacting the underside of the work carrier 26 and taking the weight thereof off of the spindle 27. Then the clamp plugs 60, 61 and the set screw 57 are loosened to release the support 29 from the spindle 27. The jack 147 is then operated to adjust the position of the work carrier 26 to the desired new position, after which the set screw 57 and the clamp plugs 60, 61 are again tightened.

When the height of the workpiece to be ground exceeds that which can be compensated for by the vertical adjustment of the disc grinder units 40 and 42, then the disc grinder units 41 and 43 may be lowered. When the disc grinder units 41 and 43 are lowered, the support 146 must be lowered accordingly. Any suitable means may be provided for the vertical adjustment of the support 146 including eccentric cam members, such as the eccentric cam members 154 mounted on the front plate of the upright section and illustrated in FIGURE 2.

Although only a preferred embodiment of the invention has been specifically illustrated and described herein, it is to be understood that minor variations may be made in the structure and function of the disc grinder of this disclosure without departing from the spirit and scope of the invention, as defined by the appended claims.

We claim:

1. In a disc grinder of the type wherein workpieces are moved relative to a rotating abrasive disc in a surface grinding operation, the improvement residing in a frame having a T shape in plan and including an upright front section and a rearwardly extending upright transverse section, and a pair of disc grinding units mounted in a vertical position on each side of said transverse section.

2. The disc grinder of claim 1 wherein a horizontal work carrier is provided for moving workpieces in grinding position, and support means carried by said frame suspending said work carrier in said frame.

3. The disc grinder of claim 1 wherein a horizontal work carrier is provided for moving workpieces into grinding position, said front section and said transverse section are notched to receive said work carrier, and support means carried by said frame suspending said work carrier in said frame.

4. The disc grinder of claim 1 wherein a horizontal work carrier is provided for moving workpieces into grinding position and support means carried by said frame suspending said work carrier in said frame, said work carrier passing through front section and projecting forwardly thereof to provide a readily accessible loading station at the front of said disc grinder.

5. The disc grinder of claim 1 wherein a horizontal work carrier is provided for moving workpieces into grinding position and support means carried by said frame suspending said work carrier in said frame, and drive means for said work carrier mounted at a readily accessible position at the upper front portion of said frame.

6. The disc grinder of claim 1 wherein a horizontal work carrier is provided for moving workpieces into grinding position, a spindle for said work carrier rotatably journalled in said transverse section, and drive means for said spindle mounted at the top of said front section.

7. The disc grinder of claim 1 wherein each pair of said disc grinding units includes a pair of vertically spaced opposed rotatable abrasive discs, and a horizontal work carrier mounted in said frame for movement between discs of said pairs of discs.

8. The disc grinder of claim 1 wherein each pair of disc grinding units includes a pair of vertically spaced opposed rotatable abrasive discs, a horizontal work carrier mounted in said frame for movement between discs of said pairs of discs, and dressing means for said abrasive discs carried by said front section on opposite sides of said transverse section.

9. The disc grinder of claim 1 wherein each pair of said disc grinding units includes a pair of vertically spaced opposed rotatable abrasive discs, and a horizontal work carrier mounted on said frame for movement between discs of said pairs of discs, said work carrier being carried by a carriage mounted on a spindle, and said carriage having means releasably mounting said work carrier for movement between a position centered relative to said spindle and offset positions to opposite sides of said spindle whereby said work carrier may be selectively moved to an out-of-the-way position relative to said abrasive discs.

10. The disc grinder of claim 1 wherein each pair of said disc grinding units includes a pair of vertically spaced opposed rotatable abrasive discs, and a horizontal work carrier mounted in said frame for movement between discs of said pairs of discs, said work carrier being carried by a carriage mounted on a spindle, and said carriage having means releasably mounting said work carrier for movement between a position centered relative to said spindle and offset positions to opposite sides of said spindle whereby said work carrier may be selectively moved to an out-of-the-way position relative to said abrasive discs, and dressing means for said abrasive discs carried by said front section on opposite sides of said transverse section.

11. The disc grinder of claim 1 wherein each pair of said disc grinding units includes a pair of vertically spaced opposed rotatable abrasive discs, and a horizontal work carrier mounted in said frame for movement between discs of said pairs of discs, said work carrier being mounted on said spindle for movement transversely of said spindle by a guide and slide assembly, and releasable lock means for locking said slide on said guide in a position with said work carrier centered relative to said spindle.

12. The disc grinder of claim 1 wherein each pair of said disc grinding units includes a pair of vertically spaced opposed rotatable abrasive discs, a horizontal work carrier mounted in said frame for movement between discs of said pairs of discs, said abrasive discs of each pair being tilted towards each other in converging relation in the direction of movement of said work carriage therebetween, and means mounting each abrasive disc for simultaneous tilting and swivelling movement about two different generally horizontal axes in a single operation.

13. The disc grinder of claim 1 together with
(a) a work carrier rotatably suspended in said frame from said transverse section for carrying workpieces between both sets of said abrasive discs,
(b) a loading station where said carrier passes through said front section,
(c) a driving mechanism for said carrier mounted in the upper portion of said frame,
(d) means for controlling the operation of said abrasive discs and said carrier comprising
(e) a control panel in said front section.

14. The disc grinder of claim 1 wherein said front section and said transverse section are horizontally notched, a vertical spindle is mounted in said transverse section, a work carrier mounted for rotation on said spindle, said work carrier projecting to opposite sides of said transverse section and forwardly of said front section, a drive unit for said spindle and said work carrier mounted at the top front portion of said frame in a readily accessible position, each pair of said disc grinding units including a pair of opposed abrasive discs having said work carrier passing therebetween, control means carried by said front section for controlling the positions of said abrasive discs and the operation of said disc grinding units and said work carrier, a dresser unit carried by the rear surface of said front section on each side of said transverse section for dressing said abrasive discs, and said carriage having means releasably mounting said work carrier for movement between a position centered relative to said spindle and offset positions to opposite sides of said spindle whereby said work carrier may be selectively moved to an out-of-the-way position relative to said abrasive discs.

15. The disc grinder of claim 14 wherein each disc grinding unit includes a guide, a slide mounted for movement along said guide, said guide being mounted on said transverse section for both tilting and swivelling movement relative to said transverse section, and a single control unit for simultaneously effecting the angle of tilt and the angle of swivel.

16. The disc grinder of claim 1 wherein a horizontal work carrier is provided for moving workpieces into grinding position, and support means carried by said frame suspending said work carrier in said frame, said work carrier being vertically adjustable, and a jack unit mounted in said frame cooperable with said work carrier to effect the vertical positioning thereof.

17. The disc grinder of claim 1 wherein each pair of said disc grinding units includes a pair of vertically spaced opposed rotatable abrasive discs, and a horizontal work carrier mounted in said frame for movement between discs of said pairs of discs, the center of said work carrier being located between said front section and a line extending through the centers of said disc grinding units.

18. In the mounting of a disc grinding unit wherein the disc grinding unit is of the type having an abrasive disc mounted in an adjustable but fixed tilted position relative to the path of movement of workpieces and wherein the disc grinding unit is supported from a reference surface disposed in angular relation to the path of movement of workpieces when engaged with said abrasive disc, the improvement residing in a mount for said disc grinding unit particularly constructed to allow the tilting and swivelling of the abrasive disc relative to said reference surface, means for swivelling said abrasive disc, and means directly responsive to said swivelling movement to effect tilting of said abrasive disc.

19. The disc grinding unit of claim 18 wherein tilting of said abrasive disc is accomplished by means of a wedge effective in response to swivel movement of said disc grinding unit.

20. The disc grinding unit of claim 18 wherein tilting of said abrasive disc is controlled by means of contacting and relatively movable wedge surfaces on said reference surface and disc grinding unit, said wedge surfaces sloping generally in the direction of movement of said disc grinding unit in the adjustment of the swivel thereof, and releaseable clamp means normally clamping said wedge surfaces tightly against one another.

21. The disc grinding unit of claim 18 wherein tilting of said abrasive disc is controlled by means of contacting and relatively movable wedge surfaces on said reference surface and disc grinding unit, said wedge surfaces sloping generally in the direction of movement of said disc grinding unit in the adjustment of the swivel thereof, those portions of said reference surface and said disc grinding unit defining said wedge surfaces being tubular, and a clamp bolt extending through said portions normally tightly clamping said wedge surfaces against one another.

22. The disc grinding unit of claim 18 wherein tilting of said abrasive disc is accomplished by means of a wedge effective in response to swivel movement of said disc grinding unit, and swivelling of said disc grinding unit is effected by means of a rotatable cam.

References Cited

UNITED STATES PATENTS

| | | | |
|---|---|---|---|
| 793,408 | 6/1905 | Altenbaugh | 51—134 |
| 1,926,974 | 9/1933 | Einstein | 51—118 X |
| 1,978,674 | 10/1934 | Johnson | 51—118 |
| 2,424,448 | 7/1947 | Gardner | 51—111 |
| 2,709,876 | 6/1955 | Indge | 51—118 |
| 3,142,137 | 7/1964 | Fallon | 51—111 |

HAROLD D. WHITEHEAD, Primary Examiner

UNITED STATES PATENT OFFICE
CERTIFICATE OF CORRECTION

Patent No. 3,458,957         Dated   August 5, 1969

Inventor(s)     Elman R. Dunn et al.

It is certified that error appears in the above-identified patent and that said Letters Patent are hereby corrected as shown below:

In the drawings, Fig. 4 read shortened lead line to next closest element. Fig. 11 read shortened lead line 76 to next closest element. Add numeral 80 with lead line to former element 76. Fig. 12 read delete numeral 23 and its lead line and numeral 76 replace lead line to former element 23. Numeral 80 make lead line solid.

Signed and sealed this 15th day of February 1972.

(SEAL)
Attest:

EDWARD M. FLETCHER, JR.                ROBERT GOTTSCHALK
Attesting Officer                      Commissioner of Patents

UNITED STATES PATENT OFFICE
CERTIFICATE OF CORRECTION

Patent No. 3,458,957  Dated August 5, 1969

Inventor(s) Elman R. Dunn et al.

It is certified that error appears in the above-identified patent and that said Letters Patent are hereby corrected as shown below:

Column 10, claims 9 and 10, lines 6 and 7 of each, "carriage" should read -- carrier portion --. Column 12, claims 20 and 21, line 2 of each, "contacting" should read -- co-acting --.

Signed and sealed this 27th day of June 1972.

(SEAL)
Attest:

EDWARD M. FLETCHER, JR.
Attesting Officer

ROBERT GOTTSCHALK
Commissioner of Patents